United States Patent [19]

Dalto

[11] Patent Number: 5,483,799
[45] Date of Patent: Jan. 16, 1996

[54] TEMPERATURE REGULATED SPECIMEN TRANSPORTER

[76] Inventor: Michael Dalto, 1494 Sweetman Ave., Elmont, N.Y. 11003

[21] Appl. No.: 235,472

[22] Filed: Apr. 29, 1994

[51] Int. Cl.⁶ .................................................. F25B 21/02
[52] U.S. Cl. .................. 62/3.7; 62/457.9; 62/3.6
[58] Field of Search ............................... 62/3.2, 3.3, 3.6, 62/3.62, 3.7, 457.9

[56] References Cited

U.S. PATENT DOCUMENTS

| | | | |
|---|---|---|---|
| 3,168,816 | 2/1965 | Petrie | 62/3.6 |
| 3,823,567 | 7/1974 | Corini | 62/3.6 |
| 4,301,658 | 11/1981 | Reed | 62/3.3 |
| 4,364,234 | 12/1982 | Reed | 62/3.3 |
| 4,745,759 | 5/1988 | Bauer et al. | 62/3.2 |
| 4,823,554 | 4/1989 | Trachtenberg et al. | 62/3.3 |
| 4,989,626 | 2/1991 | Takagi et al. | 137/13 |
| 5,061,630 | 10/1991 | Knopf et al. | 435/290 |

*Primary Examiner*—Henry A. Bennett
*Assistant Examiner*—William C. Doerrler

[57] ABSTRACT

A temperature regulated specimen transporter for controlling the temperature and environment of a clinical specimen during transportation thereof comprising an insulated and thermally conductive storage compartment; a heat sink mechanism coupled to the storage compartment for heating and cooling the storage compartment; a temperature control mechanism coupled to the storage compartment for setting a plurality of desired temperature set points; a temperature sensing mechanism coupled to the heat sink mechanism and temperature control mechanism, the temperature sensing mechanism having a first orientation for allowing the heat sink mechanism to heat the storage compartment and a second orientation for allowing the heat sink mechanism to cool the storage compartment based on the desired temperature set points; and a power source mechanism for energizing and de-energizing the heat sink mechanism, temperature control mechanism, and temperature sensing mechanism.

1 Claim, 5 Drawing Sheets

TEMPERATURE REGULATED SPECIMEN TRANSPORTER

BACKGROUND OF THE INVENTION

1. Field of the Invention

The present invention relates to a temperature regulated specimen transporter and more particularly pertains to controlling the temperature and environment of a clinical specimen during transportation with a temperature regulated specimen transporter.

2. Description of the Prior Art

The use of transportable containers is known in the prior art. More specifically, transportable containers heretofore devised and utilized for the purpose of controlling the temperature of objects placed therein are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,713,302 to Reviel discloses a personal insulin cooler. U.S. Pat. No. 4,143,711 to Beitner discloses a portable refrigerator unit. U.S. Pat. No. 4,326,383 to Reed et al. discloses a compact thermoelectric refrigerator. U.S. Pat. No. 4,581,898 to Preis discloses a small thermoelectric cooler. U.S. Pat. No. 4,704,870 to Beitner discloses a thermoelectric cooler.

While these devices fulfill their respective, particular objective and requirements, the aforementioned patents do not describe a temperature regulated specimen transporter that is portable in design, allows a plurality of temperature set points to be entered, and heats and cools specimens contained therein based on the set points entered.

In this respect, the temperature regulated specimen transporter according to the present invention substantially departs from the conventional concepts and designs of the prior art, and in doing so provides an apparatus primarily developed for the purpose of controlling the temperature and environment of a clinical specimen during transportation.

Therefore, it can be appreciated that there exists a continuing need for new and improved temperature regulated specimen transporter which can be used for controlling the temperature and environment of a clinical specimen during transportation. In this regard, the present invention substantially fulfills this need.

SUMMARY OF THE INVENTION

In the view of the foregoing disadvantages inherent in the known types of transportable containers now present in the prior art, the present invention provides an improved temperature regulated specimen transporter. As such, the general purpose of the present invention, which will be described subsequently in greater detail, is to provide a new and improved temperature regulated specimen transporter and method which has all the advantages of the prior art and none of the disadvantages.

To attain this, the present invention essentially comprises, in combination, an essentially rectangular and hollow storage compartment having an insulated bottom wall, insulated side walls extending upwardly therefrom to define an opening, and an insulated top wall hingeably coupled to a side wall adjacent to the opening, the walls each having thermally conductive portions formed therein; a heat sink coupled to the conductive portions of the walls for heating and cooling the storage compartment; fan means coupled to the heat sink for drawing heat to and from the storage compartment; temperature control means coupled to the storage compartment for setting and displaying desired minimum, maximum and operational temperature set points, recording actual minimum and maximum temperatures, displaying operational status, and outputting status signals based on the operational temperature set points; a thermocouple coupled to the heat sink, the thermocouple having a first orientation for allowing the heat sink to heat the storage compartment and a second orientation for allowing the heat sink to cool the storage compartment; a temperature control circuit coupled between the temperature control means and the thermocouple and operable in one mode for placing the thermocouple in the first orientational state and another mode for placing the thermocouple in the second operational state based on the temperature set points, each mode being activated based on status signals received from the temperature control means, whereby allowing the storage compartment to be alternately heated and cooled, the temperature control circuit including relay means for controlling the operational state of the thermocouple, relay switching means for controlling the relay means, and power protection means adapted for preventing overloaded power from damaging the relay means and relay switching means; and power source means for energizing and de-energizing the heat sink, fan means, temperature control means, thermocouple, and temperature control circuit.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved temperature regulated specimen transporter which has all the advantages of the prior art transportable containers and none of the disadvantages.

It is another object of the present invention to provide a new and improved temperature regulated specimen transporter which may be easily and efficiently manufactured and marketed.

It is a further object of the present invention to provide a new and improved temperature regulated specimen transporter which is of durable and reliable construction.

An even further object of the present invention is to provide a new and improved temperature regulated specimen transporter which is susceptible of a low cost of manufacture with regard to both materials and labor, and which accordingly is then susceptible of low prices of sale to the consuming public, thereby making such a temperature regulated specimen transporter economically available to the buying public.

Still yet another object of the present invention is to provide a new and improved temperature regulated specimen transporter which provides in the apparatuses and methods of the prior art some of the advantages thereof, while simultaneously overcoming some of the disadvantages normally associated therewith.

Even still another object of the present invention is to provide a new and improved temperature regulated specimen transporter for controlling the temperature and environment of a clinical specimen during transportation.

Lastly, it is an object of the present invention to provide a new and improved temperature regulated specimen transporter comprising an insulated and thermally conductive storage compartment; heat sink means coupled to the storage compartment for heating and cooling the storage compartment; temperature control means coupled to the storage compartment for setting a plurality of desired temperature set points; temperature sensing means coupled to the heat sink means and temperature control means, the temperature sensing means having a first orientation for allowing the heat sink means to heat the storage compartment and a second orientation for allowing the heat sink means to cool the storage compartment based on the desired temperature set points; and power source means for energizing and de-energizing the heat sink means, temperature control means, and temperature sensing means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
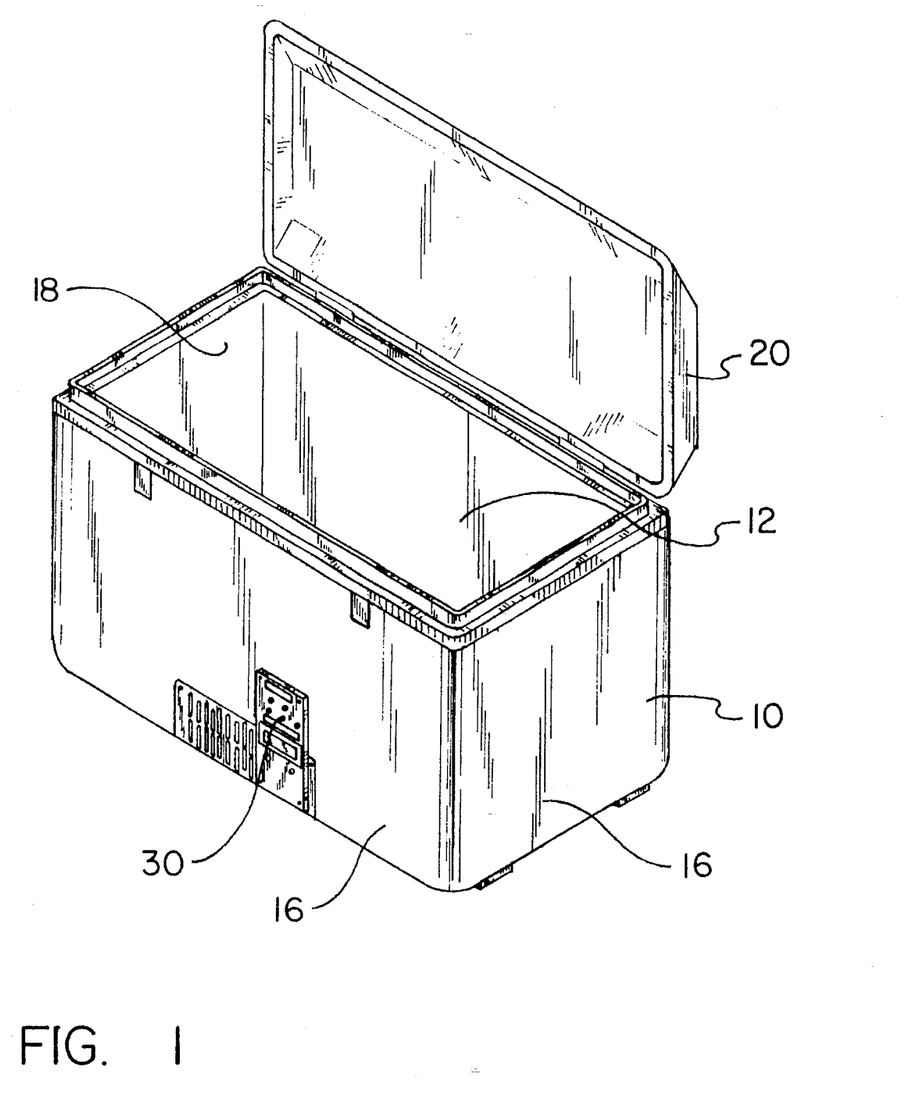
FIG. 1 is a perspective view of the preferred embodiment of the temperature regulated specimen transporter constructed in accordance with the principles of the present invention.
Figure 2:
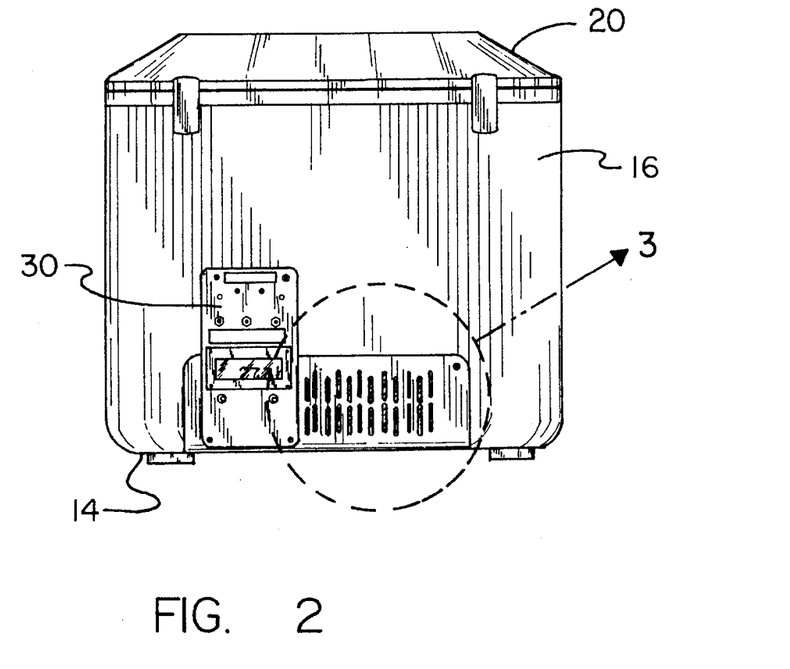
FIG. 2 is a side elevational view of the present invention.
Figure 3:
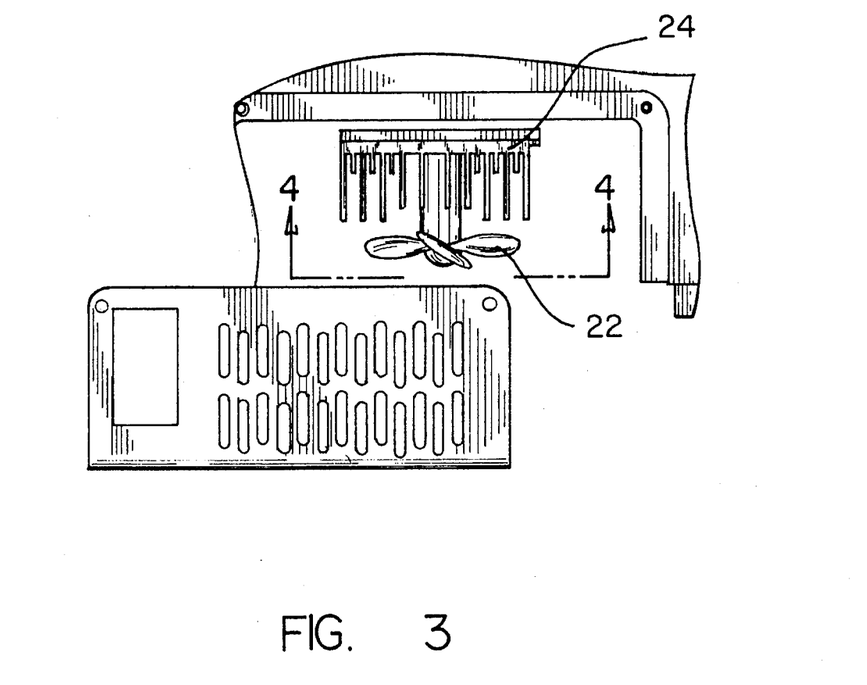
FIG. 3 is an enlarged view of the heat sink and centrifugal fan means of the present invention. A side panel from the storage compartment has been removed to expose the heat sink.
Figure 4:
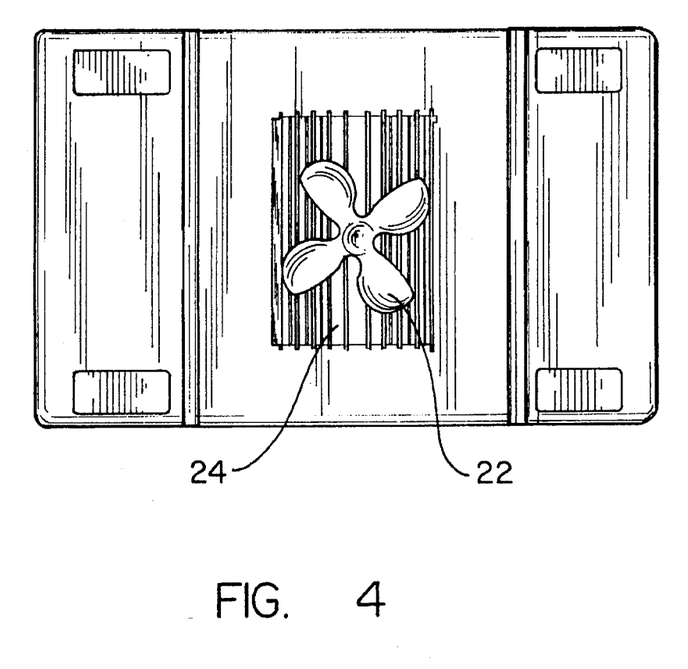
FIG. 4 is a view of the heat sink and fan means taken along the line 4—4 of FIG. 3.

With reference now to the drawings, and in particular, to FIG. 1 thereof, the preferred embodiment of the new and improved temperature regulated specimen transporter embodying the principles and concepts of the present invention and generally designated by the reference number 10 will be described.

Specifically, the present invention includes seven major components. The major components are the storage compartment, heat sink, fan means, temperature control means, thermocouple, temperature control circuit, and power source means. These components are interrelated to provide the intended function.

More specifically, it will be noted in the various Figures that the first major component is the storage compartment 12. The storage compartment is essentially rectangular and hollow in structure. It has an insulated bottom wall 14, insulated side walls 16 extending upwardly therefrom to define an opening 18 and an insulated top wall 20 hingeably coupled to a side wall adjacent to the opening. Each of the walls has thermally conductive portions formed therein.

The second major component is the heat sink 24. The heat sink is coupled to the conductive portions of the walls 14, 16. The heat sink is used for heating and cooling the interior of the storage compartment.

The third major component is the fan means 22. The fan means are coupled to the heat sink 24. The fan means are adapted for drawing heat to and from the storage compartment 12 through the heat sink. The fan means ventilates air over the heat sink to increase cooling efficiency.

The fourth major component is the temperature control means 30. The temperature control means are coupled to the compartment 12. The temperature control means are used for setting and displaying the desired minimum, maximum and operational temperature set points for the interior of the storage compartment. The temperature control means are also used for recording actual minimum and maximum temperatures within the storage compartment. The temperature control means displays the operational status of the storage compartment and outputs status signals based on operational temperature set points.

The fifth major component is the thermocouple 40. The thermocouple is coupled to the heat sink 24. The thermocouple has a first orientation for allowing the heat sink to heat the interior of the storage compartment 12. The thermocouple has a second orientation for allowing the heat sink to cool the interior of the storage compartment.

The sixth major component is the temperature control circuit 50. The temperature control circuit is coupled between the temperature control means 30 and the thermocouple 40. The temperature control means is operable in one mode for placing the thermocouple in a first operational state. The temperature control circuit is operable in another mode for placing the thermocouple in a second operational state. Transitions from one mode to another are based on the temperature set points, with each mode being activated based on status signals received from the temperature control means for allowing the storage compartment 12 to be alternately heated and cooled. The temperature control circuit includes relay means 52 for controlling the operational state of the thermocouple. The temperature control circuit also includes relay switching means 54 for controlling the relay means. Power protection means 56 are also included and are adapted for preventing overloaded power from damaging the relay means and relay switching means.

The seventh major component is the power source means 60. The power source means is utilized for energizing and de-energizing the heat sink, fan means, and temperature control means. The power source means are also utilized for energizing the thermocouple and temperature control circuit.

The present invention has the ability to control the temperature of clinical specimens during transportation to the laboratory. By maintaining a constant temperature, the present invention enhances the ability of commercially available specimen transport systems to maintain clinical specimens in a state equivalent to the time they were collected. The integrity of the clinical specimens can be compromised if the ambient temperature in which these specimens are kept varies more than plus or minus 5° C. Since failure of analytical procedures are frequently the result of specimens compromised during transport this device can help insure the accuracy of laboratory tests.

Specifically, the quality of a clinical specimen is influenced by the way in which it is collected and the manner in which it is transported to the laboratory. It is the laboratory's responsibility to positively influence the quality of the specimen being submitted by ensuring that proper collection and transport devices are available for use and providing written guidelines pertaining to the selection, collection and transport of specimens to be submitted to the laboratory.

The intent of present invention is to get specimens to the laboratory in a state equivalent to the form they existed at the time they were collected. There are many factors which can influence the achievement of this goal. Maintaining specimen container orientation helps prevent specimen leakage, decreasing entry of exogenous contaminants and contact of laboratory personnel to the specimen. This .factor may also influence results of analytical tests, for example blood vacuum tubes must be maintained in a vertical position to promote complete clot formation and reduce the possibility of hemolysis. Turn around time of specimen transport is another important factor. For example, the influence of the glycolytic metabolism of blood cells on various chemical analysis may be prevented by insuring specimen transport to the laboratory within 45 minutes from the time of collection so that serum or plasma can be separated from the blood cells. Microbiological specimens are particularly sensitive to transport turn around time. Despite efforts to prolong the viability of pathogenic organisms the time in which they remain viable is limited. Any factor which can affect the physiology of a pathogenic organism during transport has the potential to affect organism viability and specimen quality. Microorganism physiology can be regulated by controlling the environment in which the specimens are transported. Atmosphere is an example of a crucial factor which can affect microorganism physiology. For the success of anaerobic culturing the lethal effect of atmospheric oxygen must be nullified during transport until the specimen can be processed anaerobically in the laboratory. Another example is the variety of transport media designed to preserve organisms is a clinical specimen and minimize overgrowth of organisms in a mixture. These media provide a non-nutrient reducing environment which help prolong the survival of pathogenic agents by maintaining a favorable pH, preventing dehydration, inhibiting self-destructive enzymatic reactions within the cells and preventing the lethal effects of oxidation. Even in this environment growth of certain organisms can occur, in addition to growth of organisms supported by nutrients in the specimen. Consequently, the time which transport media remains effective is limited highlighting the need for rapid specimen transport to the laboratory and the need to further control the environment in which specimens are transported.

Temperature is a factor which can add an additional dimension of control to specimen transport. Refrigeration at 5° C. will preserve the viability of most pathogens and minimize overgrowth of commensal organisms. It has long been as accepted practice that certain clinical specimens such as urine and feces in transport medium may be refrigerated for several hours until they can be conveniently handled. This practice allows immediate attention to be given to specimens that contain pathogens which may not survive storage or variation in temperature such as cerebrospinal fluid or specimens which contain oxygen sensitive anaerobes such as from wounds. Unfortunately, it is often not possible or practical for specimens to be transported rapidly to the laboratory where the different specimen types can be sorted and the culture needs for maximum pathogen isolation addressed. This is especially a problem for specimens collected at night, from outlying clinics or from physician offices where specimens must be stored while awaiting transportation to the laboratory. Specimens suspected of containing pathogens which will not survive refrigeration are held at room temperature and may be subjected to temperature variations which exceed plus or minus 5° C.

To fulfill these constraints, the present invention is designed to maintain the optimum temperature for survival of suspected pathogens while specimens are awaiting and during transportation to the laboratory. The present invention has both heating and cooling capabilities to maintain a constant temperature in the event of positive or negative temperature variations. The present invention has a convenient size to allow hand delivery by a messenger and easy loading onto motorized transportation. The present invention has a rigid construction so that specimen containers can be transported in an upright position and be protected from accidental impact damage during transportation. The present invention acts as a primary barrier isolating the messenger from the specimens. Lastly, the present invention is designed to be affordable so that several units can be maintained at a collection site with each unit set to a different temperature. This configuration allows trained medical personnel with access to laboratory specimen transportation guidelines to decide the best storage temperature for the specimen.

In the preferred embodiment, the present invention consists of a thermoelectric cooler manufactured by Cool-Team. Other coolers may also be utilized. The manufacturer and model of the cooler will determine the shape, size and power consumption of the unit.

Figure 7:
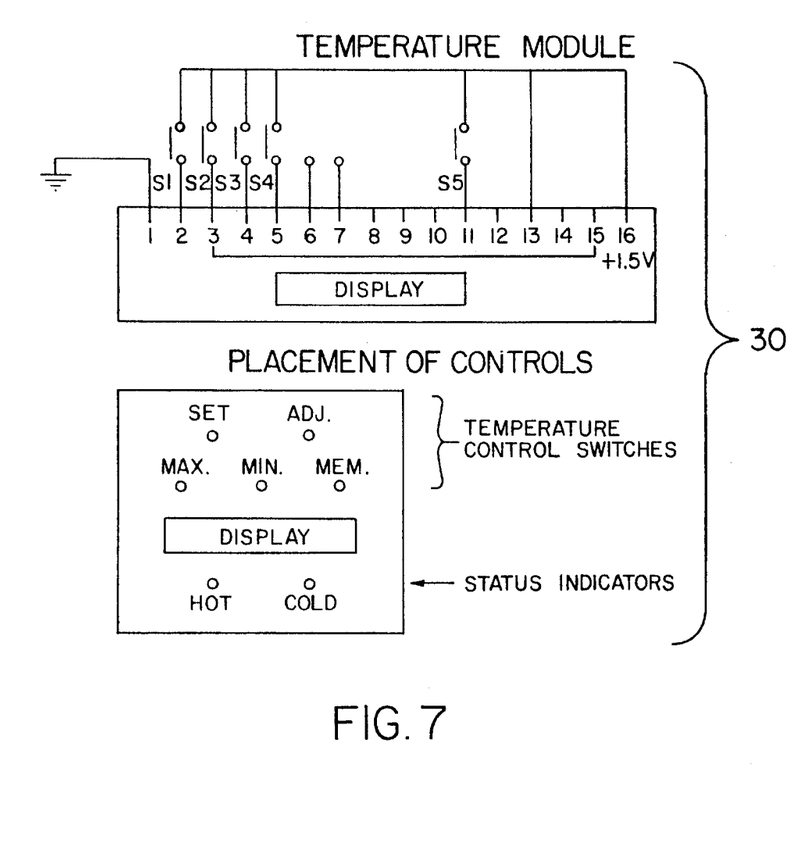
FIG. 7 is a schematic diagram of the temperature control means. An Archer temperature control module is utilized. S1–S5 depict single pulse single throw push-button switches. The SET and ADJ switches are recessed mounted.. The hot and cold status indicators are light emitting diodes.
Figure 8:
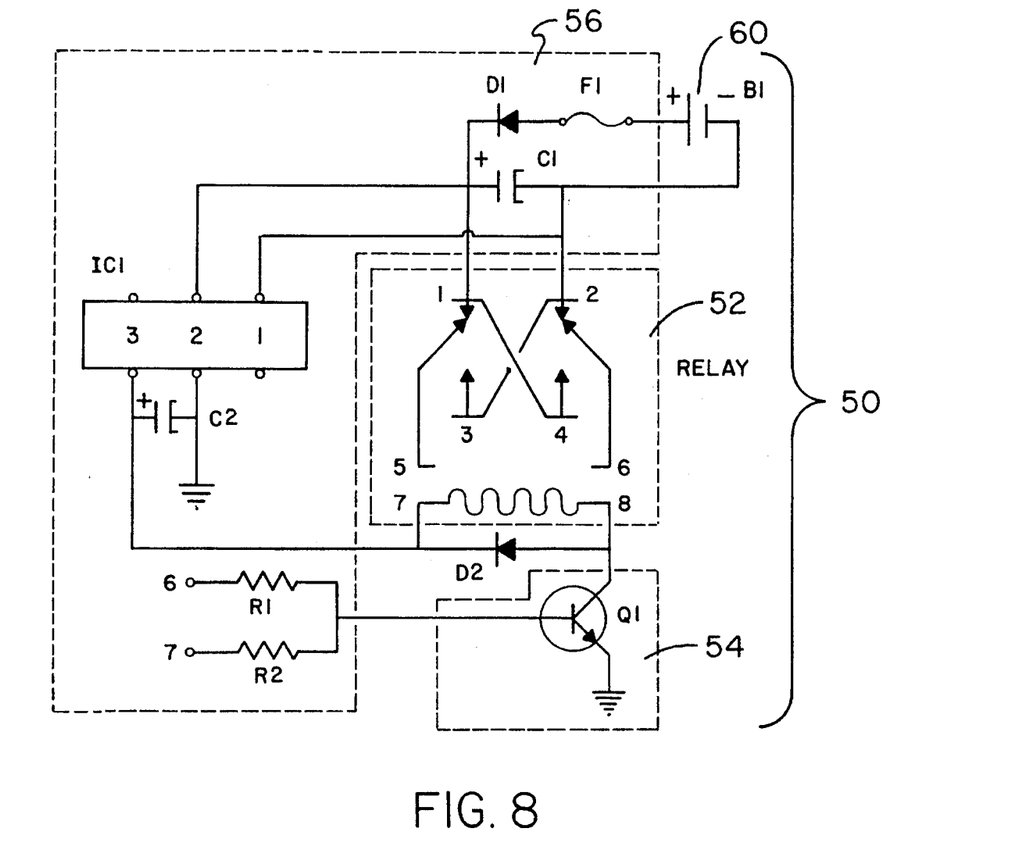
FIG. 8 is a schematic diagram of the temperature control circuitry. B1 is a 12 volt battery or an AC to DC power converter. C1 is a 1,000 micro farad capacitor. C2 is a 1 micro farad capacitor. D1 is a 6 amp rectifier diode. D2 is a 1 amp rectifier diode. F1 is a 5 amp AGC type fuse. IC1 is a 12 volt DC voltage regulator. Q1 is a NPN transistor. R1 and R2 are 100 ohm resistors. The relay is a double pole double throw type.

The cooler is fitted with the temperature control means of FIG. 7 and the temperature control circuit of FIG. 8. The schematic parts list is included in TABLE 1 and TABLE 2. An ARCHER temperature control module manufactured by Radio Shack is used as the temperature control means. The temperature control circuit is controlled by the temperature control module. The temperature control module has a temperature probe form-fitted to the interior of the cooler. The temperature probe is attached to the heat sink from the bottom of the cooler and pressure fitted thereto with a back grommet. The temperature control circuit allows the present invention to refrigerate until a minimum temperature set point is exceeded. When the temperature drops below minimum temperature a relay is activated causing the unit to heat.

If the temperature control circuit is configured so that the present invention heats until a maximum temperature is exceeded, then only the maximum temperature :Bet point should be employed. This alternate circuit configuration can be achieved by switching wires on relay contacts 5 and 6. The temperature control circuit illustrated of FIG. 8 is designed to be flexible with both minimum and maximum set point capabilities. The maximum set point of the temperature control module can be disabled by disconnecting transistor Q1 from Pin 6 of the temperature module.

Figure 5:
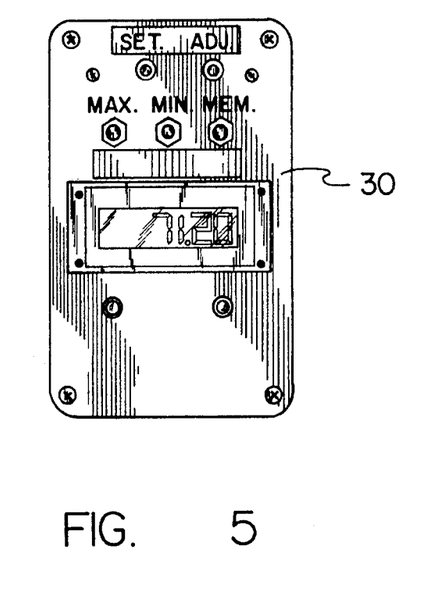
FIG. 5 is a close-up view of the temperature control means of the present invention. Three control switches are shown at the top. Two light emitting diode indicator lamps are shown at the bottom.
Figure 6:
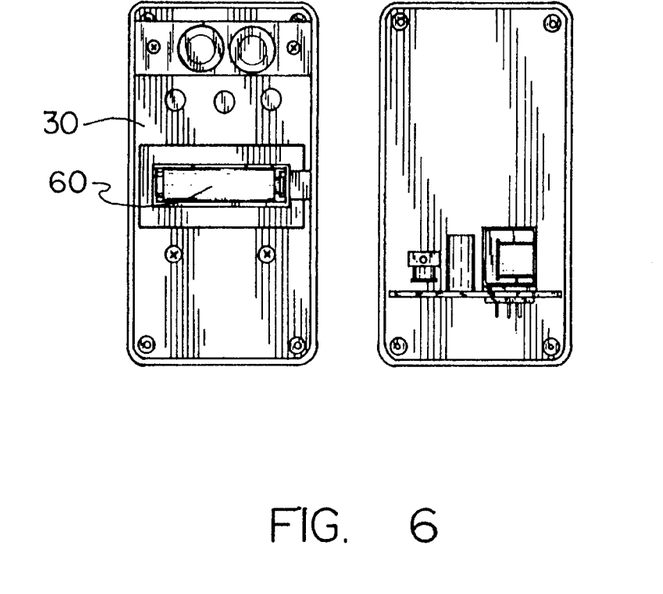
FIG. 6 is a view of the interior of the temperature control means. Light emitting diode indicator lamps are shown at the left. Power source means are shown on the left and right.

Referring to FIG. 7, to set the minimum temperature, set point press switch S1, (SET switch) while holding switch S4, (MINimum temperature switch). When the minimum temperature set point is activated "MIN" appears in the display. To adjust the minimum temperature set point press switch S2, (ADJust temperature switch) while holding the MINimum temperature switch (see FIG. 5 for switch labels). The minimum temperature set point advances. Release both switches when the desired temperature is displayed. The SET temperature and ADJust temperature switches are recess mounted to prevent an accidental change of the minimum temperature set point. The temperature control means has the ability to display the values of the minimum and maximum temperature set point. Press and hold the MINimum temperature switch to display the minimum temperature set point. Press and hold switch S3, (MAXimum temperature switch) to display the maximum temperature set point. The maximum temperature set point should always display a default value of 50° C. The temperature control means also has the ability to store the minimum and maximum recorded temperatures. This function can be utilized to determine the temperature range maintained by the instrument during quality control checks. To recall the minimum and maximum recorded temperatures press switch S5, (MEMory switch) and "MEM" will appear in the display. Press the MINimum temperature switch. The minimum recorded temperature displays and "MIN" flashes in the display. Press the MAXimum temperature switch. The maximum recorded temperature displays and "MAX" flashes in the display. Press the MEMory switch again for the display to return to normal. To reset the stored minimum recorded temperature press the MEMory switch while pressing the MINimum temperature switch. To reset the stored maximum recorded temperature press the MEMory switch while pressing the MAXimum temperature switch.

While the preferred embodiment is in operation, when either the maximum or minimum temperature set point is reached (or until any button is pressed.) Pin 15 outputs a 2 kHz signal for one minute. The temperature control means does not perform any sampling during the output of this signal. The jumper connecting Pin 15 to Pin 3, or any one of the switched pins, allows a feedback loop to occur. When the signal output goes high it simulates the pressing of a button. The signal output is immediately stopped and temperature sampling resumes. By preventing the suspension of temperature sampling more stringent temperature regulation is maintained. A jumper connecting pin 15 to Pin 2 or 3 will allow the feedback loop to function without altering the temperature module's mode of operation or display.

Furthermore, While the preferred embodiment is in operation, and when the temperature drops below the minimum temperature set point, Pin 7 goes high. When the temperature exceeds the maximum temperature set point, Pin 6 goes high. The output from these pins pass through current limiting resistors R1 and R2 and switch transistor Q1. Transistor Q1 switches a double pole double throw relay. Stationary contacts 1 and 2 of the relay are attached to a 12 volt DC power source. Jumpers connect relay contact 1 to contact 4 and contact 2 to contact 3. Power to stationary contacts 3 and 4 will have reversed polarity when compared to contacts 1 and 2. As the movable contacts 5 and 6 switches between the stationary contacts the polarity to a Peltier junction thermovoltaic heat pump (thermocouple) reverses. This will cause the thermocouple to alternately heat and cool.

Diode D1 protects the temperature control circuit from accidental reversal of polarity when connecting it to a power source. Diode D1 is rated at 6 amperes which is sufficient to operate the present invention. The contact rating of the relay is 15 amperes and is capable of controlling much larger units. For units requiring more than 6 amperes diode D1 can be replaced with a diode capable of handling a higher current. Diode D2 protects transistor Q1 from voltages produced in the relay coil. Capacitor C1 acts as a power supply filter which smooths the pulsating voltage from a power supply into a steady direct current. This protects the temperature control circuit from the power fluctuations of a moving vehicle or a faulty power converter. Capacitors C2 and C3 protect the circuit from spikes generated by the switching states of the transistor Q1, the fan motor and the thermocouple. Integrated circuit IC1 provides overvoltage protection to transistor Q1 and the relay. It regulates the input voltage to 12 volts DC. These safeguards enhance the reliability of the temperature control circuit and present invention.

Figure 9:
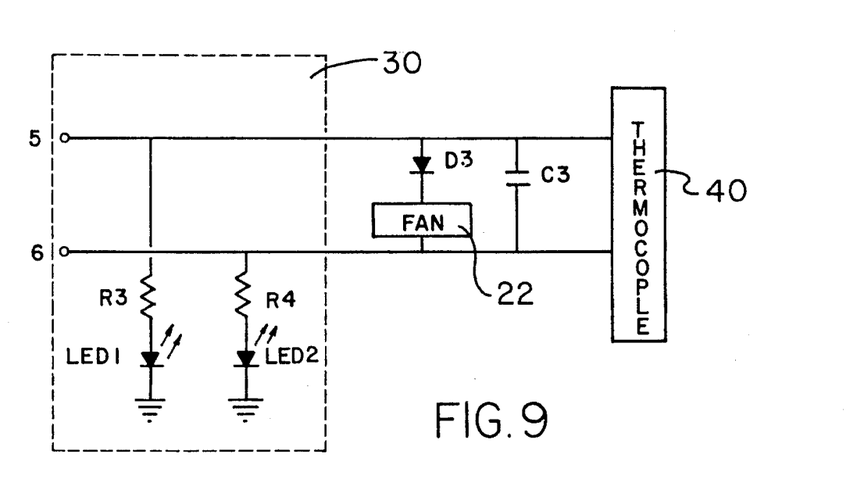
FIG. 9 is a schematic of the interface connecting the temperature control circuitry to the thermocouple. The thermocouple and fan motor are component parts of commercially available thermal electric coolers. C3 is a 470 pico farad capacitor. D3 is a 1 amp rectifier diode. LED 1 and LED 2 are light emitting diode indicator lamps. R3 and R4 are 1,000 ohm resistors.

Resistors R3 and R4 are current limiting resistors for light emitting diodes LED1 and LED2. These light emitting diodes will alternately light as the voltage polarity to the thermocouple changes. They are used to indicate the cooling or heating state of the thermocouple. Diode D3 allows the fan motor to operate while the thermocouple is cooling. The fan ventilates air over heat sink fins attached to the thermocouple. This increases the cooling efficiency of the thermocouple.

In the preferred embodiment, the storage compartment is portable and can be operated from any power source with a 12 volt DC, 6 ampere output. Some possible power sources are car batteries, AC to DC power converters and portable rechargeable batteries that can be worn as an accessory belt. The temperature control means is independently powered by a 1.5 volt AA battery. This protects the module settings from being altered when moving the storage compartment between power supplies. When the battery is changed, all settings return to default values and must be reestablished.

Two different embodiments of the present invention can be employed depending on how the thermocouple and temperature probe are fitted to the thermoelectric cooler. In the preferred embodiment, cooling efficiency is increased by employing a fan to circulate air over exterior thermocouple heat sink fins. A large interior thermocouple heat sink is form fitted to the interior of the specimen chamber. The temperature probe of the temperature module is attached to the interior heat sink close to the thermocouple. The temperature control circuit regulates the temperature of the interior heat sink. Because of the size of the heat sink there is a lag time in temperature reversal. This lag time may cause a heat sink temperature variation of up to 2.5° C. from the set temperature. This is within the accepted limits of plus or minus 5° C. for specimen transportation. The temperature of the specimen chamber will take on the average temperature of the heat sink reducing temperature variation from the set temperature. This design is space efficient and saves wear of the fan motor, the only moving part. If the fan malfunctions cooling can still occur but not as efficiently.

An alternate embodiment employs a fan motor with a dual shaft. The exterior fan blade circulates air over exterior thermocouple heat sink fins. The interior fan blade circulates air past interior thermocouple heat sink fins and then, past the temperature probe of the temperature module. The interior components are contained in a duct through which the air passes. For this configuration to be effective the temperature control circuit can be modified by eliminating diode D3 and connecting the fan motor to contacts 1 and 2 of the relay so that the air flow will always circulate in the same direction. This configuration has the benefit of more stringent temperature control. since the interior heat sink fins are a smaller size and contained within an air duct the unit will maintain its temperature for a longer time period when disconnected from a power source.

The present invention safeguards specimens against the hazards of transport and temperature. When specimen containers are inserted into leak-proof plastic bags before being placed into the present invention, the present invention becomes an effective primary barrier, protecting the messenger, patients and medical personnel from the hazard of the specimen through leaky containers. If the specimen chamber of the present invention is contaminated by a specimen it can be chemically disinfected with Lysol. Optional plastic inserts can be manufactured which would line the specimen chamber. These inserts should be thin, durable and disposable simplifying the cleaning of the specimen chamber. They would also serve as additional protection preventing seepage through the specimen chamber should the plastic bag fail to contain a specimen leak. The solid construction of the sides of the specimen chamber allow the specimen containers to be placed in a manner which maintains their orientation and protects them from accidental impact damage during transportation. The ability to maintain specimen container orientation during transportation is necessary for the proper implementation of certain commercial transport systems. For example, "Vacutainer" brand anaerobic specimen collectors (Becton Dickinson) must be transferred upright if a clinical specimen is used. Another example is the "Transgrow bottle" which must be transported in an upright position to insure that a carbon dioxide atmosphere is maintained. Specimens may be maintained in the upright position within the present invention when it is only partially full. This can be achieved by the use of an optional spring loaded hold-down bar, stretchable cargo net or velcro straps.

The present invention has the ability to heat or cool the specimen chamber for precise regulation of temperature. This feature is useful when transporting specimens at room temperature in situations where the ambient temperature can fluctuate. A temperature as low as 5° C. can be maintained eliminating the need for ice when transporting specimens at reduced temperatures. This prevents problems associated with melting ice such as specimen contamination, dripping containers, smeared labels and wet counter tops.

Although most facultative anaerobic and obligate aerobic bacteria grow well in the presence of carbon dioxide, there are certain bacteria which require carbon dioxide for growth. If their presence is suspected an environment with increased carbon dioxide is necessary. The specimen holding chamber of the present invention is of sufficient size to hold a small candle jar. Pouches or plates in which a carbon dioxide atmosphere can be chemically generated will also fit. Examples of some commercially available systems which generate a carbon dioxide atmosphere are the "Bio-Bag" (Becton Dickinson Microbiology Systems), "Anaerobic Pouch" (Difco Laboratories), "GasPack Pouch" (BBL Microbiology Systems) or "Jembec Plate" (Flow Laboratories).

Some of these systems such as the Jembec Plate are already employed in the transportation of specimens suspected of containing *Neisseria gonorrhoea*. Since this pathogen is also very sensitive to variations in temperature the specimen transporter has the potential to enhance its recovery.

The relay of the temperature control circuit is wired to the thermocouple so that when there is no current to the relay coil the specimen chamber will cool. This design has several benefits. It is a safety mechanism against mechanical failure of the relay. If this relay fails the unit will maintain itself in a refrigeration mode. Refrigeration is less detrimental to the vast majority of bacterial organisms as opposed to excessive heat. This design may also make the specimen transporter more adaptable to basic research. An optional timer can be employed in the circuit design. The timer would interrupt the current to the control relay at an operator designated interval, switching the present invention into the refrigeration mode. One possible application would be with disc-diffusion assays used for testing antibiotic activity from fermentation extracts. Depending on the test organism employed, the optimum incubation time will vary and will not always be convenient for the investigator. In this situation the present invention can be employed as an incubator in which the test organism is allowed to grow on disc-diffusion plates. At a time interval determined by the operator the present invention will refrigerate the plates preserving the results of the assay until the investigator can measure and interpret the size of the zone of inhibition. Another basic research application would be to maintain specimens collected in ecology field studies at the proper temperature during their collection and transport to the laboratory.

All the parts needed for the construction of the transporter are commercially available decreasing the cost of production. The affordable nature of the present invention will allow it to find application as an auxiliary incubator for both basic research and clinical laboratories. The addition of an optional gas port would allow the present invention to be employed in microbiology laboratories as a bench top anaerobic holding chamber during the initial setup of patient specimens or during their work-up at the bench. For medical, dental and veterinary specimen transport several temperature regulated specimen transporters can be employed at a collection site. The messenger would exchange an empty unit for a full unit and transport the full unit to the laboratory. The specimens would never be directly handled by the messenger. Each unit would be set to a different temperature and trained personnel would determine the best conditions for specimen transportation. For physician offices an optional lock can be designed into the lid preventing unauthorized access to the specimens.

The affordable nature of the specimen transporter will allow it to find application as an educational aid. It can serve as an incubator for bacterial cultures. The addition of a timer connected to a grow light attached to the inside of the specimen chamber will allow it to be employed as an environmental chamber in which protozoa and invertebrates such as Hydra can be cultured. Protozoa require cool temperatures of 20° to 22 ° C. and Hydra require dim light at 21° C.

The present invention can be used as a basic building block component of a larger transport system. For example, a phlebotomy collection cart can be fitted with a number of temperature regulated specimen transporters connected to a rechargeable power supply. The ability to immediately hold samples the phlebotomist draws on rounds at the correct temperature will help increase the accuracy of various laboratory tests.

The present invention also inherently performs two additional functions because of its rigid construction and shielding quality. First, it protects the specimen from impact damage and resulting in cross contamination between specimens. Second, by regulating the specimen's environmental temperature it provides a means for preservation of the specimen if pickup and processing is delayed. Damage of a specimen can compromise and frequently invalidate analytical procedures. The use of conventional messenger "pick-up boxes," without temperature control of adequate shielding only serves to increase the chance of this happening. The "Temperature regulated Specimen Transporter" is intended to be low cost and viable replacement for these antiquated conveyances.

TABLE 1

SCHEMATIC PART LIST

| SCHEMATIC SYMBOL | DESCRIPTION | RADIO SHACK CATALOG NO. |
| --- | --- | --- |
| B1 | Battery, 12 V DC or AC to DC power converter, 4A | |
| C1 | Capacitor, electrolytic, 1000 uF | 272-1321 |
| C2 | Capacitor, tantalum, 1.0 uF | 272-1434 |
| C3 | Capacitor, ceramic disc, 470 pF | 272-125 |
| D1 | Diode, rectifier, 6A | 276-1661 |
| D2 | Diode, rectifier, 1A | 276-1101 |
| F1 | Fuse, AGC type, 5A | 270-1278 |
| IC1 | Voltage Regulator, +12 V DC | 276-1771 |

TABLE 1-continued

SCHEMATIC PART LIST

| SCHEMATIC SYMBOL | DESCRIPTION | RADIO SHACK CATALOG NO. |
| --- | --- | --- |
| LED1 | Light Emitting Diode, green | 276-069 |
| LED2 | Light Emitting Diode, red | 276-068 |
| Q1 | NPN Transistor, 2N3053 | 276-2030 |
| R1, R2 | Resistor, 100 ohm, ¼ watt | 271-1311 |
| R3, R4 | Resistor, 1000 ohm, ¼ watt | 271-1321 |
| RELAY | Relay DPDT, coil 14.4 V DC AT 75 mA, contacts 15A at 125 VAC | 275-218 |
| S1–S5 | Switch SPST, momentary push button | 275-1547 |
| TEMPERATURE MODULE | Temperature Sensor and Control Module | 277-123 |
| THERMOCOUPLE | Component parts of Butler brand thermoelectric cooler. | |
| FAN MOTOR | COOL-TEAM, A. Preis, D-5569 Boxberg Germany | |

TABLE 2

MISCELLANEOUS PART LIST

| DESCRIPTION | RADIO SHACK CATALOG NO. |
| --- | --- |
| Bullet Connectors | 64-3047 |
| Grommet, vinyl | 64-3025 |
| Heat Shrink Tubing | 278-1627 |
| Hook and Loop Fasteners | 64-2345 |
| Hook-up wire, 22 AWG stranded | 278-1224 |
| Lighter Plug, heavy-duty with fuse | 274-335 |
| PC Board Standoffs | 276-195 |
| Perfboard, prepunched | 276-1395 |
| Project Case (15.0 × 7.75 × 5.0 cm) | 270-223 |
| Relay Socket, 10A | 275-220 |

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A temperature regulated specimen transporter for controlling the temperature and environment of a clinical specimen during transportation thereof comprising, in combination:

an essentially rectangular rigid impact-resistant storage compartment having an insulated bottom wall, insulated side walls extending upwardly therefrom to define a hollow interior and an opening for allowing access to the interior, and an insulated top wall hingeably coupled to a side wall adjacent to the opening and positionable over the opening for precluding access to the interior and with the walls each having thermally conductive portions formed therein;

a heat sink coupled to the thermally conductive portions of the walls for heating and cooling the storage compartment;

fan means coupled to the heat sink for drawing heat to and from the storage compartment and thereby increasing its heating and cooling efficiency;

temperature control means coupled to the storage compartment for manually setting and displaying desired minimum, maximum and operational temperature set points for the interior of the storage compartment, recording actual minimum and maximum temperatures within the interior of the storage compartment, displaying operational status exterior to the storage compartment, and outputting status signals exterior to the storage compartment based on the operational temperature set points;

a thermocouple coupled to the heat sink, the thermocouple having a first operational state for allowing the heat sink to heat the interior of the storage compartment and a second operational state for allowing the heat sink to cool the interior of the storage compartment;

a temperature control circuit coupled between the temperature control means and the thermocouple and operable in one mode for placing the thermocouple in the first operational state and another mode for placing the thermocouple in the second operational state based on the temperature set points, each mode being activated based on status signals received from the temperature control means to allow the storage compartment to be alternately heated and cooled to maintain a temperature within the interior of the storage compartment that varies no more than plus or minus 5 degrees Celsius from each of the operational set points, the temperature control circuit including relay means formed of a double pole double throw relay that is switchable through a pair of relay contacts for controlling the operational state of the thermocouple, and relay switching means formed of a transistor for controlling the relay means;

power source means for providing electrical power for energizing and de-energizing the heat sink, fan means, temperature control means, thermocouple, and temperature control circuit;

power protection means for preventing overloaded power from damaging the specimen transporter formed of a current-controlled first diode coupled between the relay means and the power source, a second diode coupled between the relay switching means and the relay means, a first capacitor coupled to the power source means for smoothing pulsating electrical power transmitted therefrom, and overvoltage protection means coupled between the first capacitor and the relay means and the relay switching means for regulating power applied to the relay means and the relay switching means;

a third diode coupled between the fan means and the thermocouple and the relay means and with the third diode allowing the fan means to operate while the thermocouple is cooling;

a second capacitor coupled to the relay switching means and a third capacitor coupled to the thermocouple and with the second and third capacitors smoothing electrical spikes generated by switching the relay switching means; and a pair of light-emitting diodes interconnected to the thermocouple and relay means for indicating the operational state of the thermocouple.

\* \* \* \* \*